US012383470B2

(12) United States Patent
Schmidt-Ellinger

(10) Patent No.: US 12,383,470 B2
(45) **Date of Patent: *Aug. 12, 2025**

(54) STORAGE CONTAINER FOR A STORAGE AND DISPENSING STATION AND STORAGE AND DISPENSING STATION

(71) Applicant: Becton Dickinson Rowa Germany GmbH, Kelberg (DE)

(72) Inventor: Hardy Schmidt-Ellinger, Gerolstein (DE)

(73) Assignee: Becton Dickinson Rowa Germany GmbH, Kelberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/666,405

(22) Filed: May 16, 2024

(65) Prior Publication Data

US 2024/0299253 A1 Sep. 12, 2024

Related U.S. Application Data

(63) Continuation of application No. 17/137,828, filed on Dec. 30, 2020, now Pat. No. 12,011,419.

(30) Foreign Application Priority Data

Oct. 27, 2020 (EP) .................................. 20 204 131

(51) Int. Cl.

*A61J 7/00* (2006.01)
*A61J 1/03* (2023.01)
*B65D 83/04* (2006.01)

(52) U.S. Cl.

CPC ............ *A61J 7/0076* (2013.01); *A61J 1/035* (2013.01); *B65D 83/0454* (2013.01)

(58) Field of Classification Search

CPC . A61J 1/03; A61J 1/035; A61J 7/0076; B65D 83/0454

See application file for complete search history.

(56) References Cited

U.S. PATENT DOCUMENTS 5,609,270 A * 3/1997 Walker .............. B65D 83/0409 221/202
5,619,932 A * 4/1997 Efland ....................... G07F 9/06 232/15

(Continued)

FOREIGN PATENT DOCUMENTS

EP 2962956 A1 1/2016
WO WO-2013034504 A1 3/2013

OTHER PUBLICATIONS

European Office Action for Application No. 20204131.5, dated Nov. 10, 2023, 12 pages including translation.

(Continued)

*Primary Examiner* — Gene O Crawford
*Assistant Examiner* — Kelvin L Randall, Jr.

(57) ABSTRACT

A storage container for small piece goods is provided, comprising a housing, and a separating device arranged in the housing, the separating device having a top conical surface facing an upper portion of the housing, a plurality of channels and a discharging device. The discharging device comprises a projection extending upwards from the top conical surface of the separating device into the upper portion of the housing disposed above a topmost portion of the top conical surface and a contactor coupled in an electrically dischargeable manner to the projection, the contactor configured to electrically couple the discharging device to a dispensing station contact of a dispensing station. A storage and dispensing station for small piece goods is also provided.

20 Claims, 6 Drawing Sheets

(56) References Cited

U.S. PATENT DOCUMENTS

| | | | | | |
|---|---|---|---|---|---|
| 5,865,342 | A * | 2/1999 | Ito | G07F 11/44<br>221/265 | |
| 9,238,545 | B2 * | 1/2016 | Bae | G07F 11/44 | |
| 2003/0226852 | A1 * | 12/2003 | Kobayashi | B65B 5/103<br>221/289 | |
| 2009/0108111 | A1 * | 4/2009 | Pai | A47J 42/40<br>241/36 | |
| 2011/0163112 | A1 * | 7/2011 | Takahama | G07F 17/0092<br>221/277 | |
| 2014/0203036 | A1 * | 7/2014 | Bae | A61J 1/03<br>221/277 | |
| 2018/0103530 | A1 * | 4/2018 | Ejiri | H01R 13/635 | |
| 2018/0221246 | A1 * | 8/2018 | Hellenbrand | G07F 11/42 | |

OTHER PUBLICATIONS

Extended European Search Report for Application No. 20204131.5, dated Dec. 22, 2020, 14 pages including machine translation.

International Search Report and Written Opinion for Application No. PCT/EP2021/078758, dated Jan. 17, 2022, 21 pages including English translation.

* cited by examiner

STORAGE CONTAINER FOR A STORAGE AND DISPENSING STATION AND STORAGE AND DISPENSING STATION

CROSS-REFERENCE TO RELATED APPLICATIONS

This application is a continuation of U.S. patent application Ser. No. 17/137,828, filed Dec. 30, 2020, which issued as U.S. Pat. No. 12,011,419 on Jun. 18, 2024, entitled "STORAGE CONTAINER FOR A STORAGE AND DISPENSING STATION AND STORAGE AND DISPENSING STATION," which claims priority to European Patent Application No. EP20204131.5 entitled "STORAGE CONTAINER FOR A STORAGE AND DISPENSING STATION AND STORAGE AND DISPENSING STATION" filed on Oct. 27, 2020, the disclosure of which are hereby incorporated by reference in their entirety for all purposes.

BACKGROUND

The present disclosure relates to a storage container for a storage and dispensing station for a blister machine for separable small piece goods, in particular drug portions and food supplement portions, as well as a storage and dispensing station as such.

SUMMARY

One or more embodiments provide a storage container for small piece goods, comprising a housing, and a separating device arranged in the housing, the separating device having a top conical surface facing an upper portion of the housing, a plurality of channels and a discharging device. The discharging device comprises a projection extending upwards from the top conical surface of the separating device into the upper portion of the housing disposed above a topmost portion of the top conical surface and a contactor coupled in an electrically dischargeable manner to the projection, the contactor configured to electrically couple the discharging device to a dispensing station contact of a dispensing station.

One or more embodiments provide a storage and dispensing station for small piece goods, the storage and dispensing station comprising a storage container and a dispensing station. The storage container comprises a housing, a separating device arranged in the housing, the separating device having a top conical surface facing an upper portion of the housing, a plurality of channels and a discharging device. The discharging device comprises a projection extending upwards from the top conical surface of the separating device into the upper portion of the housing disposed above a topmost portion of the top conical surface and a discharging contactor coupled in an electrically dischargeable manner to the projection. The dispensing station comprises a drive for movement of the separating device, and a dispensing station contactor electrically coupled to the projection of the storage container via the discharging contactor, the dispensing station contactor coupled to a conduction device in an electrically dischargeable manner via which conduction device electrical charges can be discharged from the storage and dispensing station.

The foregoing and other features, aspects and advantages of the disclosed embodiments will become more apparent from the following detailed description and accompanying drawings.

BRIEF DESCRIPTION OF THE DRAWINGS

In the following, preferred embodiments of the storage container according to the disclosure and the storage and dispensing station according to the disclosure are described with reference to the accompanying drawing, in which.

DETAILED DESCRIPTION

Figure 1A:
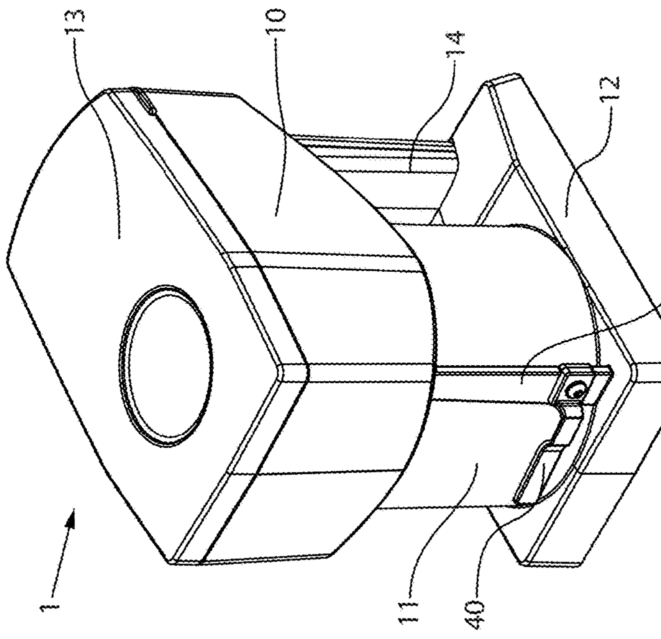
FIGS. 1*a* and 1*b* are perspective views of one or more embodiments of a storage container, according to aspects of the disclosure.

The detailed description set forth below describes various configurations of the subject technology and is not intended to represent the only configurations in which the subject technology may be practiced. The detailed description includes specific details for the purpose of providing a thorough understanding of the subject technology. Accordingly, dimensions are provided in regard to certain aspects as non-limiting examples. However, it will be apparent to those skilled in the art that the subject technology may be practiced without these specific details. In some instances, well-known structures and components are shown in block diagram form in order to avoid obscuring the concepts of the subject technology.

It is to be understood that the present disclosure includes examples of the subject technology and does not limit the scope of the appended claims. Various aspects of the subject technology will now be disclosed according to particular but non-limiting examples. Various embodiments described in the present disclosure may be carried out in different ways and variations, and in accordance with a desired application or implementation.

Modern blister machines, as disclosed, for example, in WO 2013/034504 A1, comprise several hundred storage and dispensing stations, depending on the level of expansion of the blister machine. A plurality of separable small piece goods are stored in each of these, and individual small piece goods can be dispensed on demand. The small piece goods are regularly drug portions and food supplement portions.

With blister machines, for example, drug portions stored in the storage and dispensing stations can be combined and blistered individually for each patient according to the medically prescribed intake times. To put together a plurality of drug portions, appropriate storage and dispensing stations for dispensing one or more drug portions are controlled by means of a control device of the blister machine. In order to dispense a drug portion, a drug portion stored in a storage container is separated with a separating device of the storage and dispensing station and transferred via a dispensing opening to a guide device of the blister machine. With the aid of the guide device, the dispensed drug portion, optionally by interposing a collecting device, is fed to a packaging device, which blisters individual or a plurality of drug portions.

For the separation of the drug portions stored in a storage container of a storage and dispensing station, the separating device comprises a plurality of channels, which are usually arranged on the outer circumference of a base body of the separating device. The channels are adjusted to the respective drug portions to be separated with regard to their dimensions such that the drug portions can only be arranged one above the other, but not adjacent to one another, in a channel. The channels may, for example, be dimensioned in such a way that only one drug portion may be received in one channel.

To dispense a drug portion from a channel, a channel is moved over the dispensing opening in the bottom surface of the housing of the storage container, and the drug portion arranged in the channel (at the lowest point) slides or falls due to gravitational force into the dispensing opening. In order to prevent additional drug portions stored in or above the channel from also being dispensed, i.e., an unknown number of drug portions from being dispensed, in the region above the dispensing opening a retaining portion of a retaining means or separator is guided or arranged at least in or above the channel that is aligned with the dispensing opening. The retaining portion is arranged in or above the channel with respect to the height of the channel in such a way that only one drug portion may be arranged under the retaining portion. If the retaining portion is guided into the channel to separate the lowermost drug portion from those arranged above it, individual channel-separating projections have a slot which receives the retaining portion. If the retaining portion is arranged or guided over the channels, it is guided routinely only slightly over the upper ends of the projections to avoid additional drug portions from entering the channel when the drug portion is dispensed.

When separating or dispensing drug portions, the separating device is rotated as described above. Thereby the drug portions stored in the receiving space are constantly moved, which leads to friction between the drug portions and on the housing. This friction with one another and on the housing leads to the drug portions being charged by frictional electricity, which means that the drug portions are electrostatically charged. This electrostatic charge leads to the drug portions partially "sticking" to the inner wall of the housing or to portions of the separating device. On the one hand, this leads to the fact that not the number of drug portions that are filled into the storage container is actually available for separation (because the drug portions "stick" somewhere inside) or that the drug portions are not correctly dispensed, both of which cases lead to incorrect drug combinations.

It is therefore the object of the present disclosure to provide a storage container for a storage and dispensing station for a blister machine, with which an electrostatic charge of small piece goods can be reduced during the separation thereof.

The storage container according to the disclosure for a storage and dispensing station for a blister machine, comprises a housing enclosing a receiving space having an inside circular-cylindrical portion and having a bottom surface having a dispensing opening, a separating device arranged in the inside circular-cylindrical portion of the housing and having a surface facing the receiving space and having a plurality of channels extending vertically through the separating device having a channel width for receiving at least one small piece good to be separated, and a retaining means having a retaining portion which is arranged above the dispensing opening in the circular-cylindrical housing.

According to the disclosure, it is provided that the separating device comprises an electrically dischargeable discharging device, the discharging device having at least one discharging projection extending from the surface of the separating device into the receiving space as well as a discharging contact means coupled in an electrically dischargeable manner to the at least one discharging projection for electrically coupling the discharging device to an electrically dischargeable component of a dispensing station which is assigned to the storage container and has a drive.

With the discharging device reaching into the receiving space, the electrostatic charge of the small piece goods caused by the friction is discharged via the discharging contact means into the dispensing station, the electrostatic charge of the small piece goods is reduced or even (largely) minimized or discharged, whereby the above-mentioned effects are avoided—the small piece goods do not adhere to the inner wall or parts of the separating device, incorrect combinations are avoided. The discharging device is continuously electrically dischargeable from the discharging projection to the discharging contact, although this does not have to mean that the entire discharging device as such has to be made of electrically dischargeable material-portions can, for example, be sheathed or otherwise surrounded by non-electrically dischargeable material. An electrically dischargeable material is considered to be one whose discharge resistance (surface resistance) is less than 1 TΩ ($10^{12}\Omega$).

The fact that the discharging device has at least one discharging projection that extends into the receiving space ensures that the electrostatic charge is reduced in the small piece goods arranged "further up" so that sticking to the inner wall can be prevented. This ensures that all of the small piece goods filled into the receiving space are also available for separation and dispensing. The electrical discharge in the upper region of the receiving space also ensures that the small piece goods entering the channels have a reduced electrostatic charge.

The precise structural design of the discharging device, and in particular the electrically dischargeable connection between discharging projection and the discharging contact means, depends on the precise design of the separating device. In the case of a structurally very simple (and thus cost-effective form), it is provided that the discharging projection and the discharging contact means are designed as a discharging rod having a central connecting portion.

As described above, it is substantial for the disclosure that the discharging contact means of the discharging device is electrically couplable to an electrically conductive component of a dispensing station which is assigned to the storage container and has a drive. In one or more embodiments of the storage container according to the disclosure, it is provided that the discharging contact means is formed coaxially to (and preferably on) the axis of rotation of the separating device. With a corresponding design of the discharging contact means, it can be electrically coupled to a component of the drive of the dispensing station; the discharging contact means virtually "sits" on the component of the drive (in which case this component must of course be electrically dischargeable and the charges must be able to be diverted via the dispensing station).

In particular, when the discharging contact means is formed coaxially to the axis of rotation of the separating device, it is further advantageous if the discharging contact means is designed as a discharging pin which has a contact pin pretensioned by a spring. Since the contact pin is pretensioned by means of a spring, the contact between the discharging device and the dispensing station is particularly supported.

The discharging projection of the discharging device protrudes into the receiving space, so that in particular the electrostatic charge of those small piece goods that are arranged above the surface of the separating device is reduced. In order to ensure or strengthen the discharge of any electrostatic charge that may still be present or that has built up again from small piece goods arranged "further down," it is provided in one or more embodiments of the storage container according to the disclosure that the discharging device has at least one discharging means coupled in an electrically dischargeable manner to the discharging contact means which discharging means forms a surface region of the separating device which comes into contact with small piece goods.

As explained above, the electrostatic charging of small piece goods can also cause them to get stuck in a channel (on the channel wall). The discharging projection already reduces the charging of the small piece goods, but to further reduce the charge directly before small piece goods enter a channel, one or more embodiments provides that the at least one discharging means forms at least one portion of a surface of a web formed between two channels. A corresponding embodiment is particularly advantageous for very light small piece goods (since these tend to stick or "adhere" even when they are only slightly charged).

The disclosure also relates to a storage and dispensing station for a blister machine, comprising a storage container according to the disclosure and a dispensing station having a drive for moving the separating device and having a dispensing station contact means which is designed to be electrically couplable to the discharging contact means of the discharging device of the storage container and is coupled to a conduction device in an electrically dischargeable manner via which electrical charges can be diverted from the storage and dispensing station. In one or more embodiments, it is provided that the dispensing station contact means is designed as a coupling means of the drive.

Figure 1B:
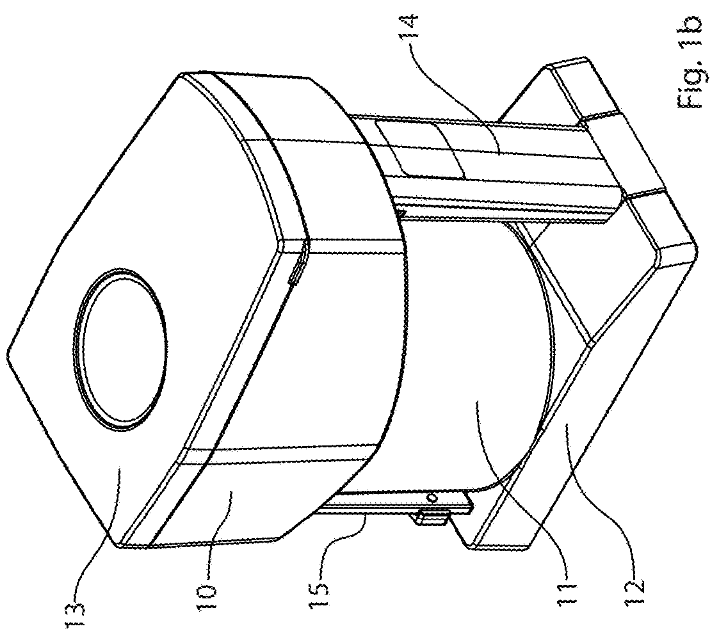
Figure 2:
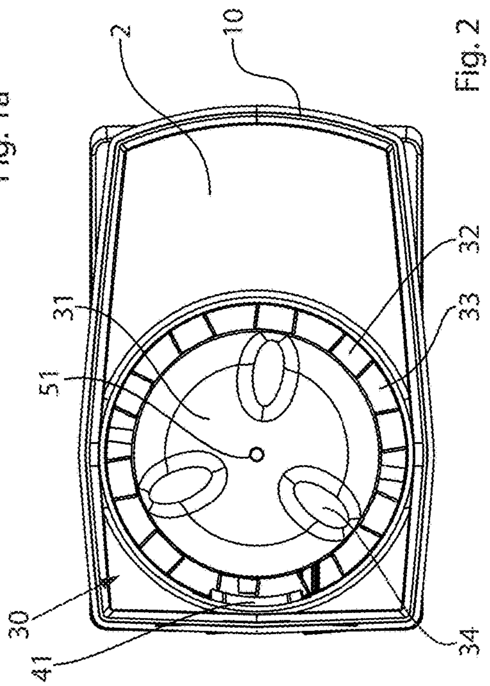
FIGS. 2 and 3 are top views of the storage container of FIGS. 1*a* and 1*b*, a separating device being omitted in FIG. 3, according to aspects of the disclosure.
Figure 3:
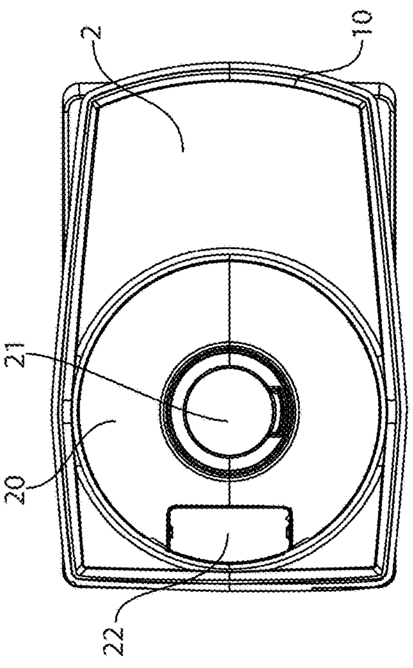

FIGS. 1*a* and 1*b* show perspective views of one or more embodiments of a storage container 1 according to the disclosure. FIGS. 2 and 3 show top views of the storage container 1 without the cover and the separating device being omitted in FIG. 3. The storage container 1 according to the disclosure includes a housing 10 which encloses a receiving space 2 (see FIGS. 2 and 3) for drug portions and which includes an inside circular-cylindrical portion 11 in the lower portion. The storage container 1 further includes a base plate 12 and a cover 13 arranged on the housing 10 during operation of the storage and dispensing station and that may be removed for refilling. For better handling, the storage container 1 includes a handle 14 in the "front" region. In the case of the "rear" portion of the circular-cylindrical portion 11, a housing projection 15 is formed in this embodiment, on which a fastening portion of a retainer assembly 40 is arranged.

As may be seen in FIG. 2, a separating device 30 having a surface 31 (e.g., conical surface) is arranged in the inside circular-cylindrical portion 11. On the surface 31 itself, elevations 34 are arranged which are, inter alia, intended to prevent drug portions from remaining lying on the surface 31. Furthermore, the elevations 34 ensure that the drug portions move so that they slide toward the channels 32 arranged on the outer edge of the separating device 30. The channels 32 are defined by webs 33 which can be formed in one piece with a base body 35 (FIG. 4*a*) of the separating device 30. In aspects of the disclosure, the webs 33 can be attached to the base body 35.

As already explained above, the channels 32 are adjusted to the shape of the drug portions to be separated so that only a defined number can be arranged in a channel 32 or in a channel portion. As can be seen from FIG. 3, in which the separating device 30 has been omitted, the housing 10 includes a bottom surface 20 with a central opening 21 for receiving a coupling means of the separating device and a dispensing opening 22 via which drug portions are dispensed, first to the dispensing station and then on to other components of the blister machine. In FIG. 2, a discharging projection 51 of a discharging device 50 (FIG. 4*a*) can be seen in the center of the separating device 30.

Figure 4B:
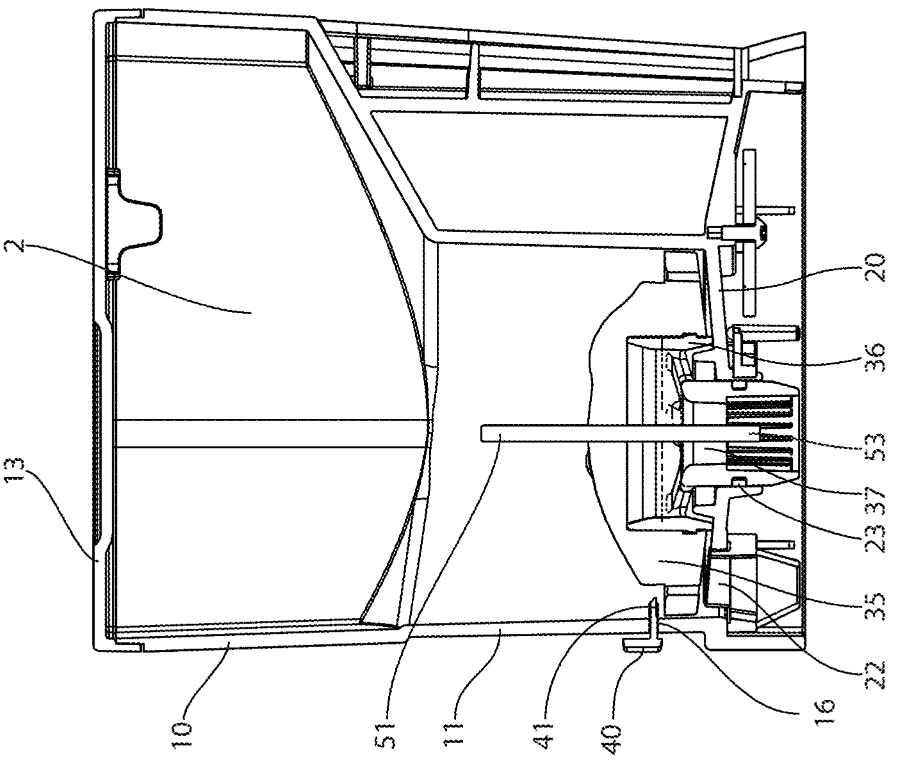
FIGS. 4*a* and 4*b* are sectional views of the storage container of FIGS. 1*a* and 1*b*, FIG. 4*a* showing a perspective view and FIG. 4*b* showing a side view, according to aspects of the disclosure.
Figure 4A:
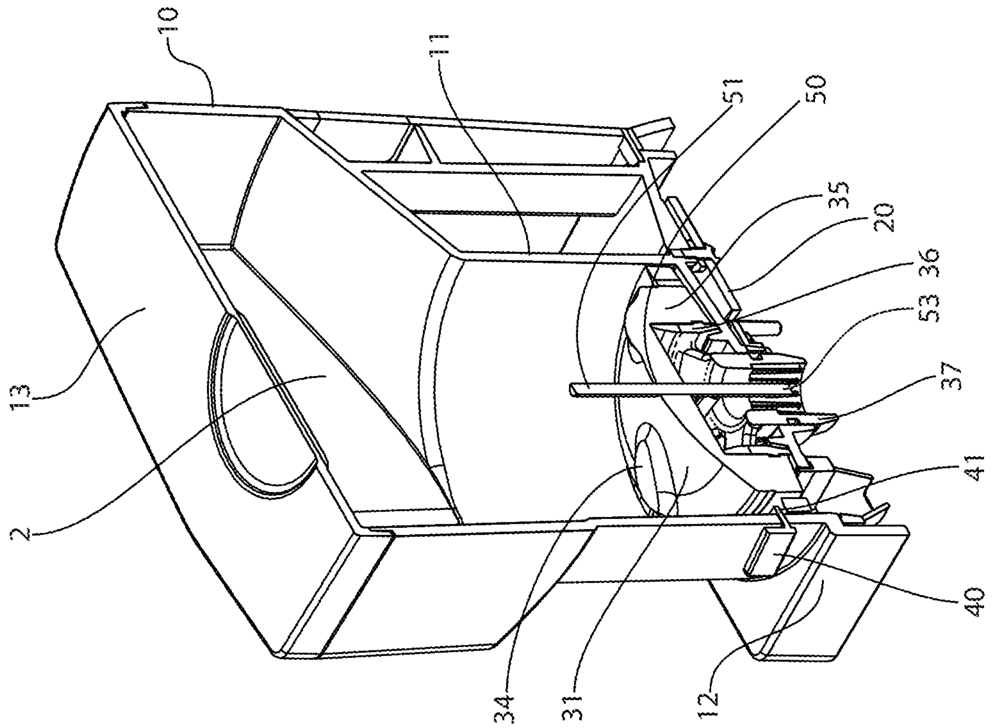

FIGS. 4*a* and 4*b* are sectional views of the storage container 1, FIG. 4*a* showing a perspective view and FIG. 4*b* showing a side view. The precise internal structure of the separating device 30 can be seen in FIGS. 4*a* and 4*b*. In aspects of the disclosure, this includes a base body 35 with a conical surface 31 on which a plurality of elevations 34 are arranged. The base body 35 is hollow on the inside and is connected to an upper coupler 36, which is connected to a lower coupler 37. This lower coupler 37 has an inner profile, by which it is releasably couplable to a coupler (not shown) of a drive shaft (also not shown) of a drive in a dispensing station. A releasable coupling is advantageous because the storage container 1 can easily be removed from the storage and dispensing station to refill drug portions. The lower coupler 37 has a circumferential groove into which a projection 23 of the housing 10 engages in order to prevent the separating device 30 from "lifting off."

In the sectional views of FIGS. 4*a* and 4*b*, it can be seen that a discharging device 50 extends on the axis of rotation of the separating device 30, which discharging device 50 includes a discharging projection 51 that extends into the receiving space 2. In aspects of the disclosure, the discharging projection 51 is designed to be very long. In aspects of the disclosure, the discharging projection 51 can also be shorter or have a different shape. For the disclosure it is not substantial that, for example, the discharging projection 51 extends over its entire length on the axis of rotation of the separating device 30, although this is one or more embodiments. How far the discharging projection 51 extends into the receiving space 2 is, inter alia, dependent on the type of drug portions to be separated. In aspects of the disclosure, the discharging projection 51 extends at least by two channel widths KB (viewed from the surface at the exit point) into the receiving space 2. It is substantial in this case that the at least one discharging projection 51 (depending on the drug portions to be separated) protrudes so far into the receiving space 2 that a sufficient discharge of the electrical charge of the drug portions is ensured.

At the other end of the discharging device 50, the discharging device 50 includes a discharging contactor 53, which may be rod-shaped. The discharging contactor 53 is connected to the discharging projection 51 in an electrically dischargeable manner, wherein, in the simplest case as shown here, the discharging projection 51 and the discharging contactor 53 are designed as a one-piece rod that is formed coaxially with or on the axis of rotation of the separating device 30. The discharging device 50 may be made of stainless steel, or in general, any dischargeable material (see above for definition) is suitable as long as there is a dissipative connection between the discharging projection 51 and the discharging contactor 53.

FIGS. 4*a* and 4*b* also show the arrangement of the retaining assembly 40, which is fastened to the housing projection 15 in aspects of the disclosure. A retaining portion 41 of the retaining assembly 40 is passed through a slot 16 in the housing 10 and is aligned with the dispensing opening 22 in the bottom surface 20. This alignment leads to the fact that in the case of the channel 32 that is arranged above the dispensing opening 22, no further drug portion can slide subsequently into the channel 32.

In aspects of the disclosure, it is conceivable that the retaining portion 41 is guided in a slot (not shown) of the webs 33 between the channels 32, wherein the slot or retaining portion 41 separates a channel 32 into an upper and a lower channel portion (not shown). Which type of channel 32 is used depends on the drug portions to be separated and has no effect on the present disclosure.

Figure 5B:
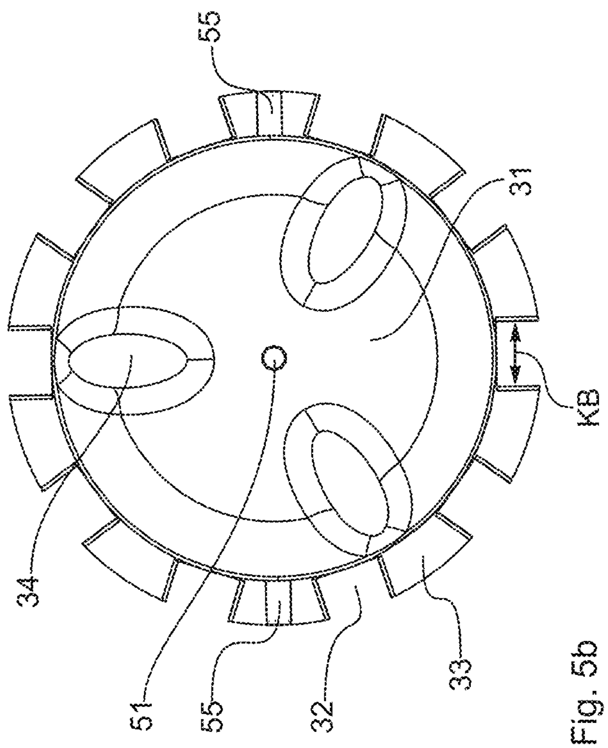
FIGS. 5*a* to 5*c* are different views of a separating device and a discharging device of one or more embodiments of a storage container, according to aspects of the disclosure.
Figure 6:
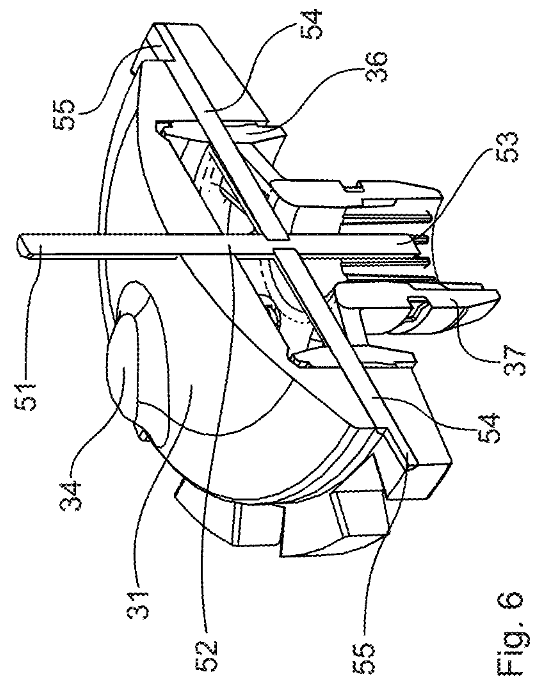
FIG. 6 is a sectional view of the separating device and the discharging device of FIGS. 5*a* to 5*c*, according to aspects of the disclosure.
Figure 5A:
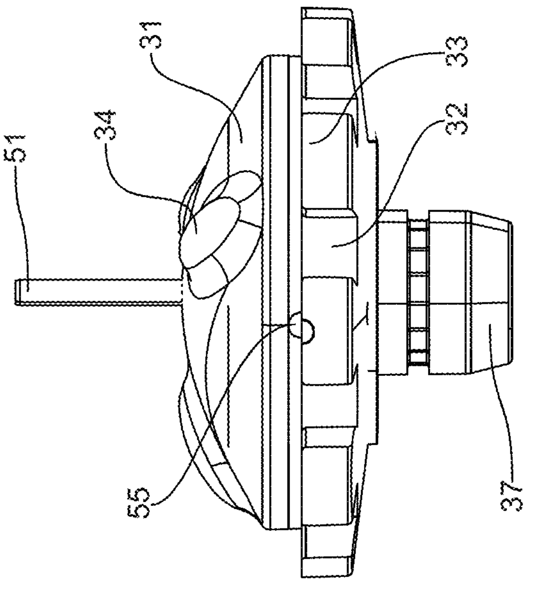
Figure 5C:
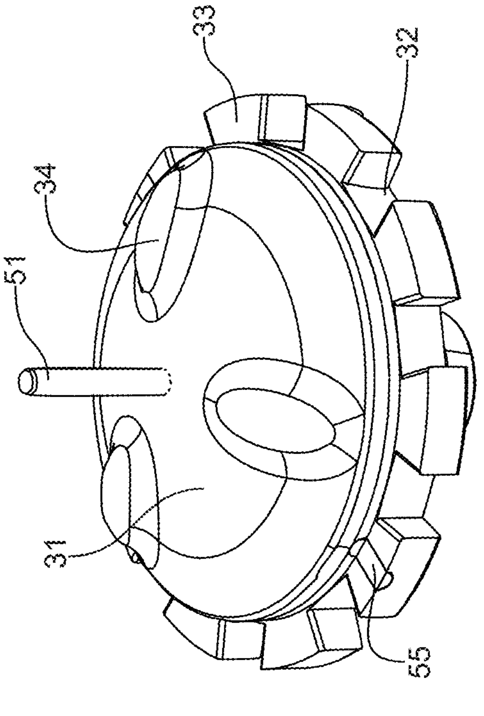

FIGS. 5*a* to 5*c* show different views of the separating device 30 and the discharging device 50 of the storage container 1 according to aspects of the disclosure. FIG. 6 shows a sectional view of the separating device 30 and the discharging device 50. In the storage container 1 shown in FIGS. 5*a* to 5*c* and 6, in addition to the components described above, the discharging device 50 comprises two discharging members 55, which in this case form surface portions of webs 33 between channels 32. These discharging members 55 are coupled to the discharging contactor 53 via connection portions 54 (only shown in FIG. 6) in an electrically dischargeable manner, such as via a connecting portion 52, for example. The discharging members 55 ensure a further (or repeated) discharge of electrical charge, in particular of those drug portions which are about to enter a channel 32. This ensures that the drug portions entering have an even lower charge, so that they do not get caught on a channel wall due to the electrical charge. In FIG. 5*b*, KB denotes the width of a channel 32, which may be adjusted to the shape of the drug portions to be separated.

Figure 7A:
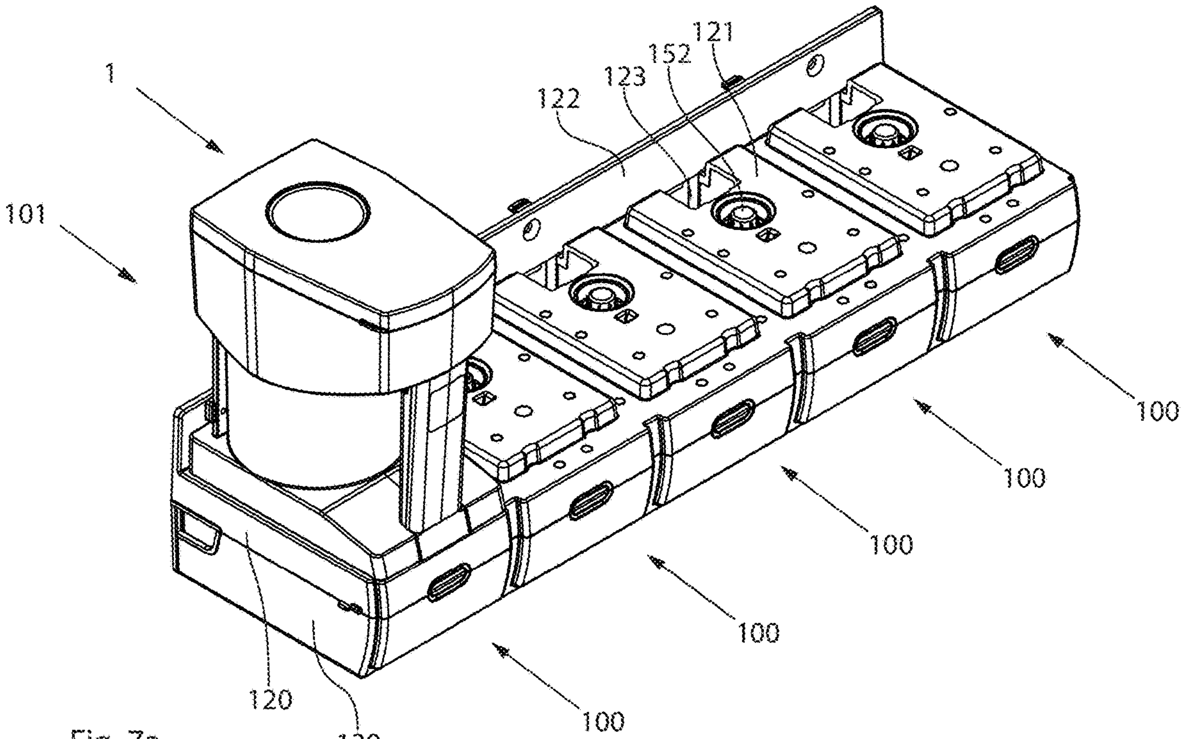
FIGS. 7*a* and 7*b* show perspective views of one or more embodiments of a storage and dispensing station, according to aspects of the disclosure.
Figure 7B:
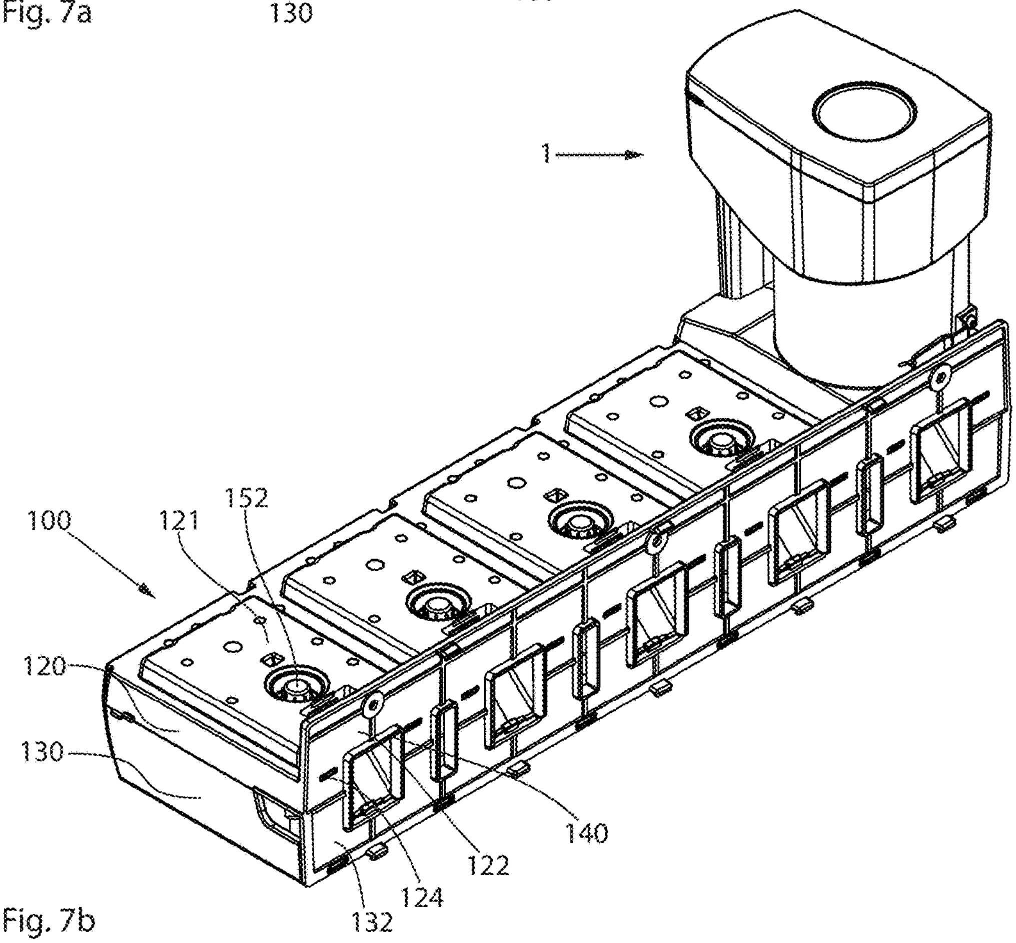

FIGS. 7*a* and 7*b* show perspective views of a storage and dispensing station 101 having a storage container 1 and a dispensing station 100, which may be designed as separate components.

In aspects of the disclosure, the dispensing station 100 is part of a network of five dispensing stations 100. In aspects of the disclosure, the dispensing stations 100 can be designed separately from one another. The components mentioned in the following description of the dispensing station 100 are present in each dispensing station 100, regardless of whether they are configured as a composite (as in FIGS. 7*a* and 7*b*) or separately.

Each dispensing station 100 includes a lower portion 130 and an upper portion 120. The upper portion 120 includes a projection 121 on which a storage container 1 can be placed. For this purpose, a lower housing portion of the storage container 1 is adjusted to the geometry of the projection 121. The projection 121 includes an opening 123 which, when the storage container 1 is attached, is aligned with the dispensing opening 22 in the bottom surface 20 of the housing 10. In the event of separation, a drug portion falls from a channel 32 via the dispensing opening 22—into the opening 123.

In the case of an end face 122, 132 formed from a housing part of the upper portion 120 and the lower portion 130, the dispensing station 100 can be attached to a blister machine (not shown). In the aforementioned end face 122, 132, an opening 140 is shown, which extends through the dispensing station 100 and ends in the opening 123, a chute (not shown) for drug portions being insertable into these openings 140, via which separated drug portions from a storage and dispensing station 101 are passed to a guide device within the blister machine. The chute extends through the dispensing station 100 up to the projection 121 in which the opening 123 for receiving a drug portion is formed.

In the aforementioned end face 122, 132 of the dispensing station 100 (only in FIG. 7*b*), a portion of a conduction device 124 can be seen with which the storage and dispensing station 101 is couplable to the blister machine in an electrically dischargeable manner and via which electrical charges can be discharged from the blister machine. In aspects of the disclosure, the conduction device 124 is arranged in the end face portion 122 of the upper portion 120 of the dispensing station 100. In aspects of the disclosure, the conduction device 124 may also be arranged in the end face portion 132 of the lower portion 130. In aspects of the disclosure, the conduction device 124 may be designed, for example, as a plug or the like. It is substantial that electrical charges can be delivered to the blister machine (not shown) via the conduction device 124. It cannot be seen in FIGS. 7*a* and 7*b* how the electrically dischargeable coupling takes place between the storage container 1 and the dispensing station 100, which is described in more detail in the following drawings on the basis of one or more embodiments.

Figure 8B:
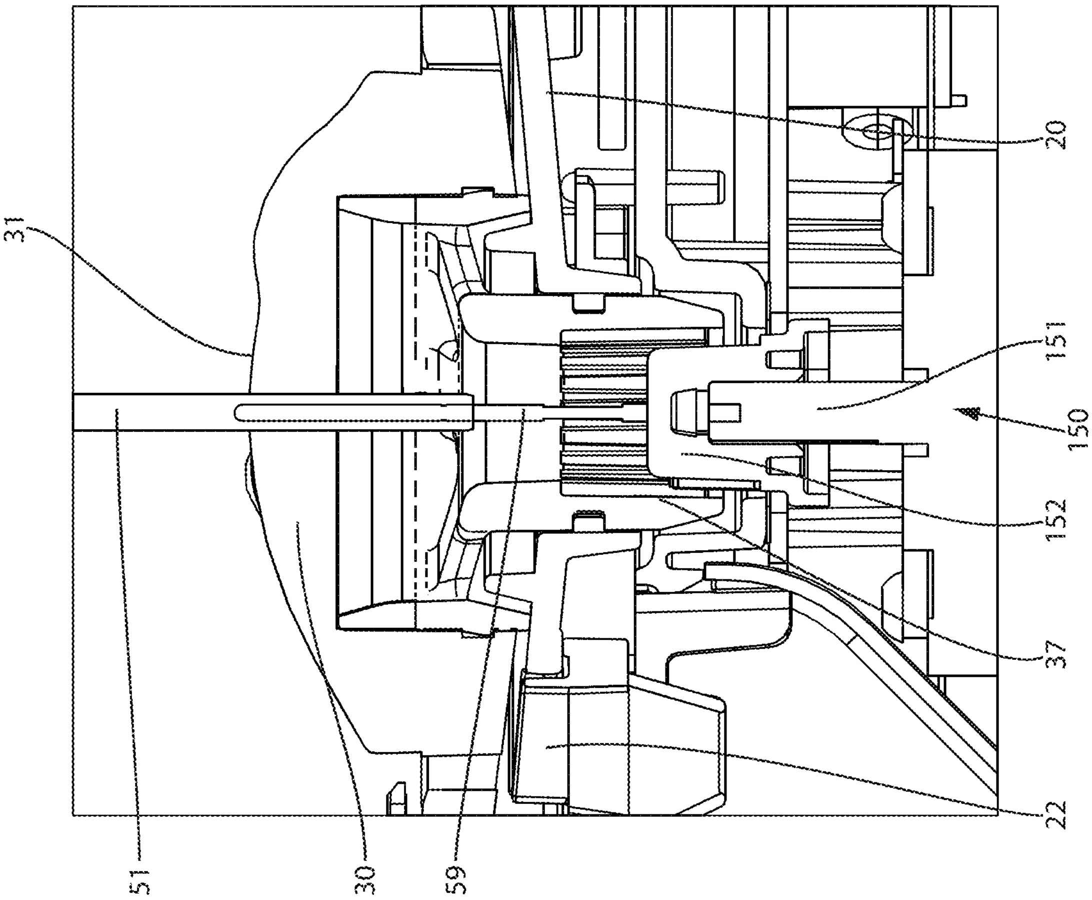
FIGS. 8*a* and 8*b* each show sectional views of one or more embodiments of a storage container of a storage and dispensing station, according to aspects of the disclosure.
Figure 8A:
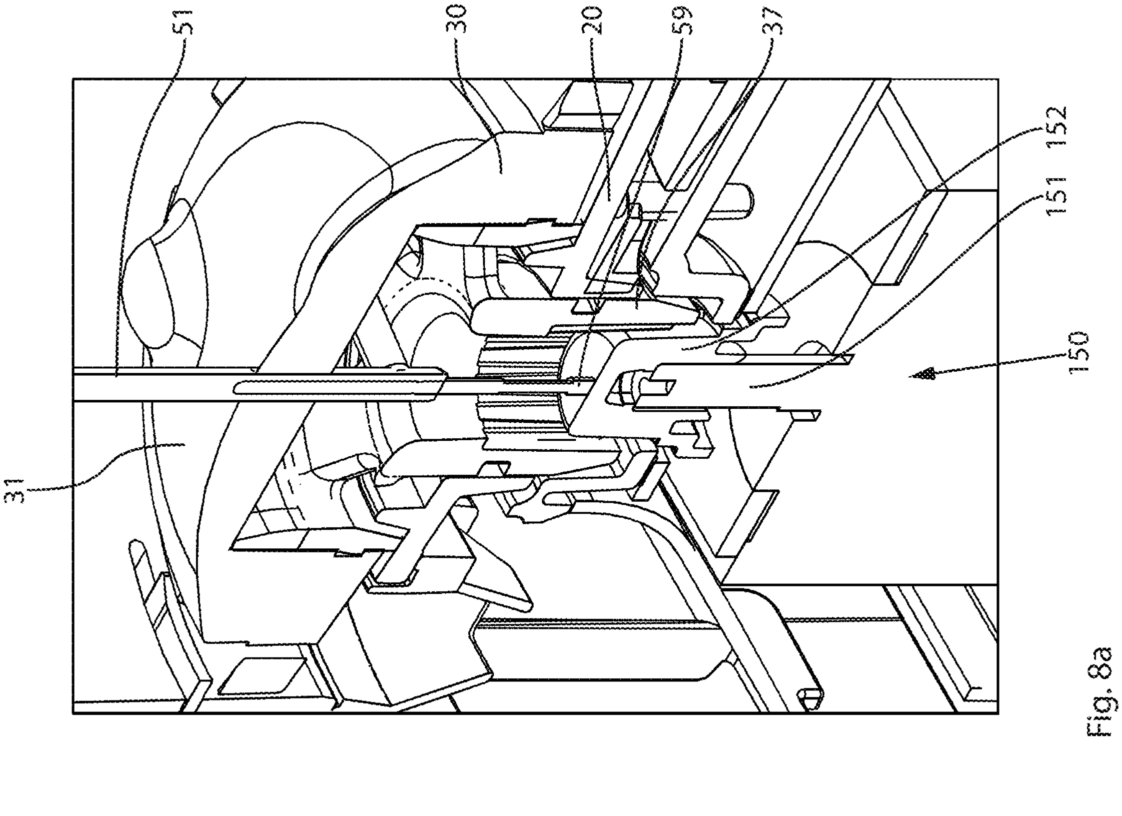

FIGS. 8*a* and 8*b* show sectional views of one or more embodiments of the storage container 1 of the storage and dispensing station 101. In FIGS. 8*a* and 8*b*, the discharging contactor of the discharging device 50 is specially designed, namely as a discharging pin 57 (FIG. 10*a*) with a contact pin 59 and a spring 58 (FIG. 10*b*), which presses the contact pin 59 downward (e.g., based on the illustration in the drawings). In aspects of the disclosure, the contact pin 59 is arranged on the axis of rotation of the separating device 30, and thus above the axis of rotation of a drive 150 of the dispensing station 100. The drive 150 comprises an axis of rotation 151 with a coupler 152 arranged on it in a rotationally fixed manner, the axis of rotation 151 and coupler 152 being connectable in a form-fitting manner.

In aspects of the disclosure, a dispensing station contact, which is substantial to the disclosure, is designed as a coupler 152 of the drive 150. Said coupler 152 is coupled to the conduction device 124 (not shown in FIGS. 8*a* and 8*b*) in an electrically dischargeable manner, so that electrical charges can be discharged from the storage and dispensing station 101. In aspects of the disclosure, it is necessary for this purpose that the axis of rotation 151 is also designed in an electrically dischargeable manner. Exactly how the conduction device 124 is coupled in an electrically dischargeable manner to the drive 150 is not substantial for the disclosure, but a plurality of possible embodiments may be used. What is substantial is the discharge of the charge, i.e., a “grounding” of the storage container 1 via, inter alia, the conduction device 124 of the dispensing station 100.

In aspects of the disclosure, the discharging device 50 is coupled to the conduction device 124 via the axis of rotation 151 of the drive 150, via which the charge is ultimately transferred from the storage and dispensing station 101 to the blister machine. In aspects of the disclosure, many other couplings between the storage container 1 and the dispensing station 100 are conceivable. The illustrated case is, however, structurally simple and there is the possibility of simply retrofitting existing dispensing stations 100.

Figure 9:
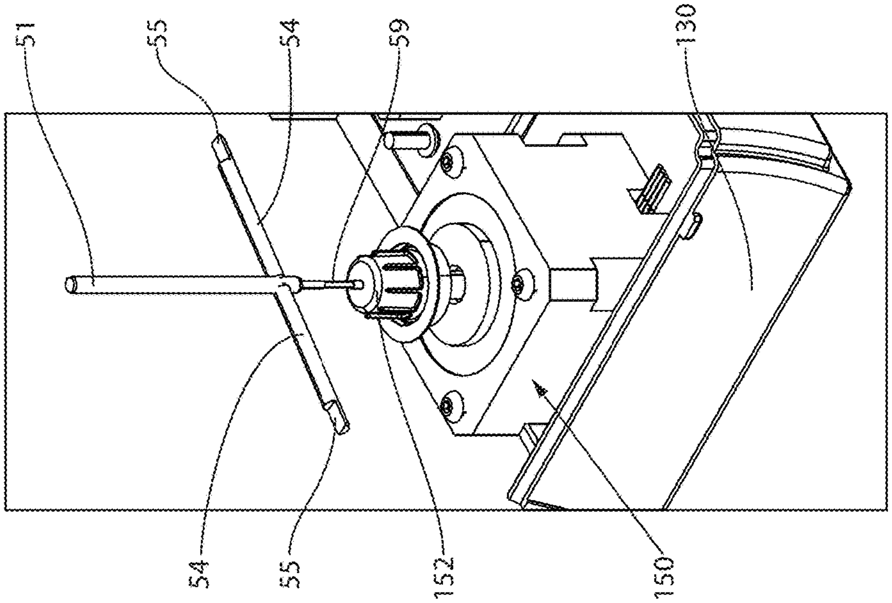
FIG. 9 is a perspective view of a discharging device in contact with a drive of the storage and dispensing station of FIGS. 8*a* and 8*b*, according to aspects of the disclosure.

FIG. 9 once again clarifies the coupling of the discharging device 50/coupler 152 of the drive 150 and shows a view of the discharging device 50 in contact with the drive 150 of the dispensing station 100. FIG. 9 shows that the contact pin 59 of the discharging device 50 is seated centrally on the coupler 152, thus ensuring excellent coupling/discharge between the discharging device 50 and the dispensing station 100.

Figure 10A:
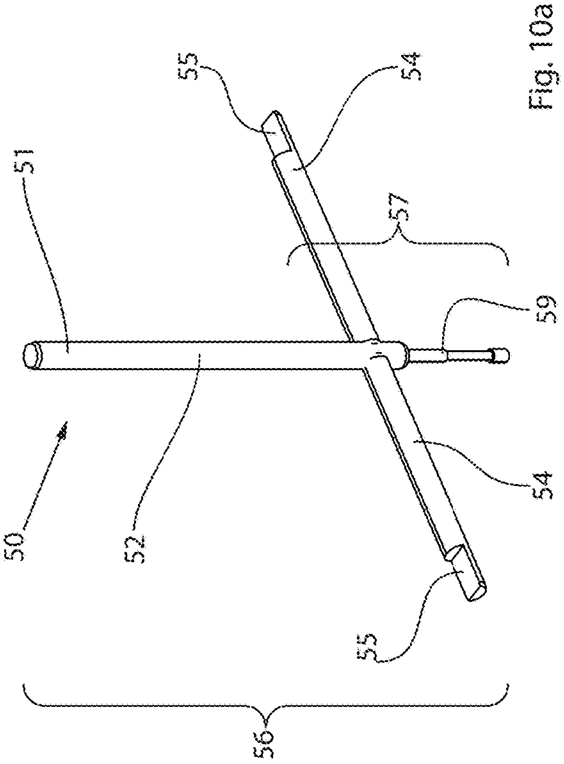
FIGS. 10*a* and 10*b* show a discharging device according to one or more embodiments, according to aspects of the disclosure.
Figure 10B:
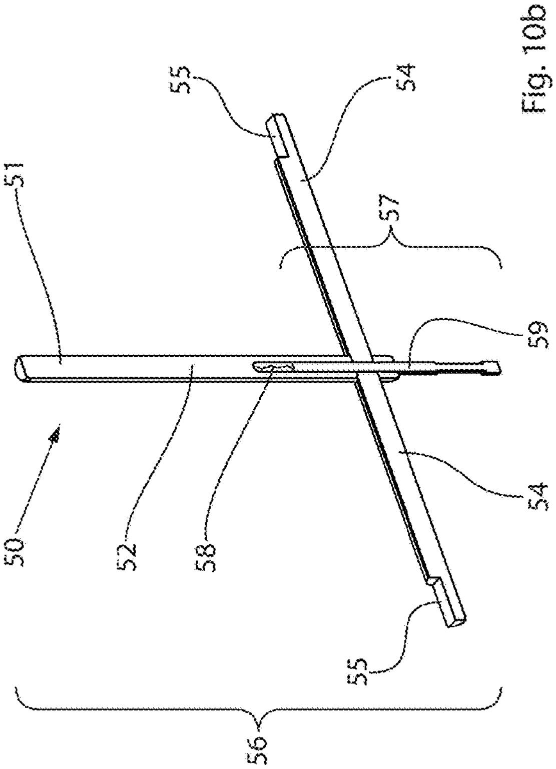

FIGS. 10*a* and 10*b* are detailed views of the discharging device 50 of the storage container 1. FIG. 10*b* showing a sectional view. In aspects of the disclosure, the discharging device 50 includes a central discharging rod 56, including the discharging projection 51, a central connecting portion 52 and a discharging contactor 53 designed as a discharging pin 57. The discharging pin 57 in turn includes a contact pin 59 that extends into a recess of the discharging rod 56 and that is pretensioned "downward" by a spring 58 (i.e., toward the coupler 152). A stop (not shown in this case) ensures that the contact pin 59 does not slide downward when the storage container 1 is lifted from the dispensing station 100 or the separating device 30 is lifted from the storage container 1.

In aspects of the disclosure, the discharging device 50 further includes two discharging members 55, which are connected in an electrically dischargeable manner to the central discharging rod 56, specifically via connecting portions 54. The discharging device 50 is therefore constructed quite simply and can subsequently be introduced into already existing separating devices 30 without considerable effort.

The present disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

A reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

The word "exemplary" or the term "for example" is used herein to mean "serving as an example or illustration." Any aspect or design described herein as "exemplary" or "for example" is not necessarily to be construed as preferred or advantageous over other aspects or designs. In one aspect, various alternative configurations and operations described herein may be considered to be at least equivalent.

As used herein, the phrase "at least one of" preceding a series of items, with the term "or" to separate any of the items, modifies the list as a whole, rather than each item of the list. The phrase "at least one of" does not require selection of at least one item; rather, the phrase allows a meaning that includes at least one of any one of the items, and/or at least one of any combination of the items, and/or at least one of each of the items. By way of example, the phrase "at least one of A, B, or C" may refer to: only A, only B, or only C; or any combination of A, B, and C.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

In one aspect, unless otherwise stated, all measurements, values, ratings, positions, magnitudes, sizes, and other specifications that are set forth in this specification, including in the claims that follow, are approximate, not exact. In one aspect, they are intended to have a reasonable range that is consistent with the functions to which they relate and with what is customary in the art to which they pertain.

It is understood that the specific order or hierarchy of steps, operations or processes disclosed is an illustration of exemplary approaches. Based upon design preferences, it is understood that the specific order or hierarchy of steps, operations or processes may be rearranged. Some of the steps, operations or processes may be performed simultaneously. Some or all of the steps, operations, or processes may be performed automatically, without the intervention of a user. The accompanying method claims, if any, present elements of the various steps, operations or processes in a sample order, and are not meant to be limited to the specific order or hierarchy presented.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f) unless the element is expressly recited using the phrase "means for" or, in the case of a method claim, the element is recited using the phrase "step for." Furthermore, to the extent that the term "include," "have," or the like is used, such term is intended to be inclusive in a manner similar to the term "comprise" as "comprise" is interpreted when employed as a transitional word in a claim.

The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way.

What is claimed:

1. A storage container for small piece goods, comprising:
   - a housing; and
   - a separating device arranged in the housing, the separating device having a top conical surface facing an upper portion of the housing, a plurality of channels and a discharging device, the discharging device comprising:
     - a projection extending upwards from the top conical surface of the separating device into the upper portion of the housing disposed above a topmost portion of the top conical surface; and
     - a contactor coupled in an electrically dischargeable manner to the projection, the contactor configured to electrically couple the discharging device to a dispensing station contact of a dispensing station.

2. The storage container of claim 1, wherein the projection and the contactor are configured as a discharging rod with a central connecting portion.

3. The storage container of claim 1, wherein the contactor is formed coaxially to an axis of rotation of the separating device.

4. The storage container of claim 1, wherein the contactor is formed as a discharging pin.

5. The storage container of claim 4, wherein the discharging pin comprises a contact pin pretensioned by a spring.

6. The storage container of claim 5, wherein the contact pin is arranged on an axis of rotation of the separating device.

7. The storage container of claim 6, wherein the contact pin is arranged above an axis of rotation of a drive of the dispensing station.

8. The storage container of claim 1, wherein the discharging device has at least one discharging member electrically conductively coupled to the contactor.

9. The storage container of claim 8, wherein the at least one discharging member forms a surface region of the separating device that comes into contact with small piece goods.

10. The storage container of claim 9, wherein the at least one discharging member forms at least one portion of a surface of a web formed between two channels.

11. A storage and dispensing station for small piece goods, the storage and dispensing station comprising:
   - a storage container comprising:
     - a housing;
     - a separating device arranged in the housing, the separating device having a top conical surface facing an upper portion of the housing, a plurality of channels and a discharging device, the discharging device comprising:
       - a projection extending upwards from the top conical surface of the separating device into the upper portion of the housing disposed above a topmost portion of the top conical surface; and
       - a discharging contactor coupled in an electrically dischargeable manner to the projection; and
   - a dispensing station, comprising:
     - a drive for movement of the separating device; and
     - a dispensing station contactor electrically coupled to the projection of the storage container via the discharging contactor, the dispensing station contactor coupled to a conduction device in an electrically dischargeable manner via which conduction device electrical charges can be discharged from the storage and dispensing station.

12. The storage and dispensing station of claim 11, wherein the dispensing station contactor is a coupler of the drive.

13. The storage and dispensing station of claim 11, wherein the projection and the discharging contactor are configured as a discharging rod with a central connecting portion.

14. The storage and dispensing station of claim 11, wherein the discharging contactor is formed coaxially to an axis of rotation of the separating device.

15. The storage and dispensing station of claim 11, wherein the discharging contactor is formed as a discharging pin.

16. The storage and dispensing station of claim 15, wherein the discharging pin comprises a contact pin pretensioned by a spring.

17. The storage and dispensing station of claim 16, wherein the contact pin is arranged on an axis of rotation of the separating device, and wherein the contact pin is arranged above an axis of rotation of the drive of the dispensing station.

18. The storage and dispensing station of claim 11, wherein the discharging device has at least one discharging member electrically conductively coupled to the discharging contactor.

19. The storage and dispensing station of claim 18, wherein the at least one discharging member forms a surface region of the separating device that comes into contact with small piece goods.

20. The storage and dispensing station of claim 19, wherein the at least one discharging member forms at least one portion of a surface of a web formed between two channels.

* * * * *